(12) United States Patent
Chen et al.

(10) Patent No.: US 8,527,624 B2
(45) Date of Patent: Sep. 3, 2013

(54) MECHANISM FOR ADAPTIVE PROFILING FOR PERFORMANCE ANALYSIS

(75) Inventors: Ying Chen, Beijing (CN); Evelyn Duesterwald, Ossining, NY (US); Ying Li, Beijing (CN); Qi Ming Teng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/130,718

(22) Filed: May 30, 2008

(65) Prior Publication Data

US 2009/0300166 A1  Dec. 3, 2009

(51) Int. Cl.
*G06F 15/173* (2006.01)
*G06F 11/00* (2006.01)
*G06F 9/44* (2006.01)
*G01R 11/00* (2006.01)
*G01R 31/28* (2006.01)

(52) U.S. Cl.
USPC .......................................... 709/224; 709/223

(58) Field of Classification Search
USPC ................. 709/223, 224; 714/100, 724, 741, 714/799; 717/127
See application file for complete search history.

(56) References Cited

U.S. PATENT DOCUMENTS

| | | | |
|---|---|---|---|
| 5,892,947 A | 4/1999 | DeLong et al. | |
| 6,115,393 A * | 9/2000 | Engel et al. | 370/469 |
| 6,374,369 B1 | 4/2002 | O'Donnell | |
| 6,400,996 B1 * | 6/2002 | Hoffberg et al. | 700/83 |
| 6,971,091 B1 | 11/2005 | Arnold et al. | |
| 7,103,877 B1 | 9/2006 | Arnold et al. | |
| 2005/0018596 A1 * | 1/2005 | Washburn et al. | 370/201 |
| 2006/0020866 A1 * | 1/2006 | Lo et al. | 714/741 |
| 2006/0020923 A1 * | 1/2006 | Lo et al. | 717/127 |
| 2006/0020924 A1 * | 1/2006 | Lo et al. | 717/127 |
| 2006/0242288 A1 * | 10/2006 | Masurkar | 709/223 |

* cited by examiner

*Primary Examiner* — David Lazaro
*Assistant Examiner* — Vitali Korobov
(74) *Attorney, Agent, or Firm* — Scully, Scott, Murphy & Presser, P.C.; Daniel P. Morris, Esq.

(57) ABSTRACT

Adaptive profiling for performance analysis of a computer system controls one or more agents to monitor a plurality of events occurring in a target computer system based on an adaptive logic. Collected data may be filtered and analyzed to determine one or more contributor events that attribute to performance of the target computer system. One or more patterns are observed or detected in said collected data, behavior of said one or more agents are adjusted based on said detected one or more patterns. The adaptive logic may be further reconfigured based on said detected one or more patterns.

25 Claims, 2 Drawing Sheets

MECHANISM FOR ADAPTIVE PROFILING FOR PERFORMANCE ANALYSIS

FIELD OF THE INVENTION

The present disclosure relates to computing system, and more particularly to adaptive profiling for performance analysis.

BACKGROUND OF THE INVENTION

Performance of software systems needs to be tuned and adjusted in order to deliver an overall high performing computing system in a dynamic computing environment. The trend toward larger numbers of cores significantly increases the complexity of performance tuning by introducing numerous new performance challenges related to concurrency such as utilization, synchronization and sharing issue. Performance profiling is a tedious task, requiring repetitive manual tasks of running, measuring, and analyzing.

A prerequisite to performance tuning is the collection of performance profile data. Complex software stacks require performance data from multiple layers of the stack (i.e., Hardware, OS, middleware, application). It is generally not known prior to execution which performance events are relevant for a particular application, for instance, which events will cause a later observed performance issue such as a bottleneck.

The process of data collection has both performance and productivity challenges. Collecting all possible performance events from all layers exhaustively is prohibitive in terms of both collection overhead (time) and performance trace volume (space). Productivity challenges arise because, for example, presenting the programmer with an excessively large volume of performance data is overwhelming and further complicates the already difficult task of performance tuning.

Accordingly, it is desirable to have a solution to make data collection both more efficient, for example, by reducing runtime collection overhead, and more productive, for example, by reducing information volume to be presented to the programmer, without the loss of relevant performance bottleneck information.

While system software benchmarking platforms exist that automatically run repetitive tasks until results stabilize and automatically highlight outlying results, eliminating manual intervention in the data collection process, those platforms are still based on exhaustive data collection.

U.S. Pat. No. 5,892,947 provides a test support tool system and method, however, that patent requires the system design as the input. U.S. Pat. No. 7,103,877 only provides selective instrumentation. U.S. Pat. No. 6,971,091 generates compilation plans for optimization. U.S. Pat. No. 6,374,369 discloses using finite state machines for analyzing software performance. Those patents do not guide the entire profiling process.

Most modern processors provide certain hardware registers to record certain performance events, such as instructions retired/completed, cycles consumed, L1, L2 cache misses, translation lookaside buffer (TLB) misses, bus or memory requests. The number of registers provided for recording such events is usually limited; for example, on the Pentium 4™, only 2 registers are provided, which means only two metrics can be collected simultaneously. The challenge is to make the best use of the existing counters while getting the most comprehensive performance view. Existing technology on performance profiling addresses this problem by time-interpolation. Time-interpolation collects different metrics at different points in time. Time-interpolation is usually implemented by either multiplexing the available hardware performance counters, or by collecting performance events across subsequent executions. The set of possible performance events is usually huge so with fixed time-interpolation across all events, one may not see enough detail on some event classes or one may be provided with too much useless information on others.

The problem remains of inducing unacceptable levels of perturbation to the target system and generating unmanageable data volumes if too much instrumentation points are enabled at the same time, and of failing to reveal useful information if too few instrumentation points are enabled.

It would be desirable to circumvent the limitation on the number of hardware performance counters, control the volume of information collected, and provide a more efficient and intelligent profiling process, for example, that automatically navigates through the massive set of data streams or volumes of data, leading the problem solvers to the real bottleneck or problem in the system.

BRIEF SUMMARY OF THE INVENTION

A method and system for automatically and adaptively profiling for performance analysis of a computer system are presented. The method, in one aspect, may comprise controlling one or more agents to monitor a plurality of events occurring in a target computer system based on an adaptive logic, filtering collected data associated with said plurality of events, analyzing said collected data to determine one or more contributor events that attribute to performance of the target computer system, detecting one or more patterns in said collected data; and adjusting the controlling of said one or more agents based on said detected one or more patterns. In another aspect, the method may further include reconfiguring the adaptive logic based on said detected one or more patterns or based on said analysis of the collected data, or combinations thereof.

A system for adaptively profiling for performance analysis, in one aspect, may comprise a controller engine module that receives logic for commanding one or more agents to control behavior of said one or more agents in monitoring a target computer system. A data filter module may receive collected data from said one or more agents and filter at least noise from said collected data. An analyzer module may analyze said collected data and determine a plurality of contributing events that affect performance of the target computer system. A pattern recognizer module may detect one or more patterns in said collected data. The controller engine module may receive said detected one or more patterns and adjust the controlling of said one or more agents based on said detected one or more patterns.

A system for adaptively profiling for performance analysis, in another aspect, may comprise one or more agents operable to monitor a target computer system. A data filter module may receive collected data from said one or more agents and filter at least noise from said collected data. An analyzer module may analyze said collected data and determine a plurality of contributing events that affect performance of the target computer system. A pattern recognizer module may detect one or more patterns in said collected data. A controller engine module may receive logic for controlling behavior of said one or more agents. The controller engine module may further receive said detected one or more patterns and adjust the controlling of said one or more agents based on said detected one or more patterns. An adaptive logic module may provide the logic for commanding said one or more agents, said logic further controlling profiling of performance analysis. The adaptive logic module may be reconfigured based on said detected one or more patterns.

A program storage device readable by a machine, tangibly embodying a program of instructions executable by the machine to perform a method of automatically and adaptively profiling for performance analysis of a computer system may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
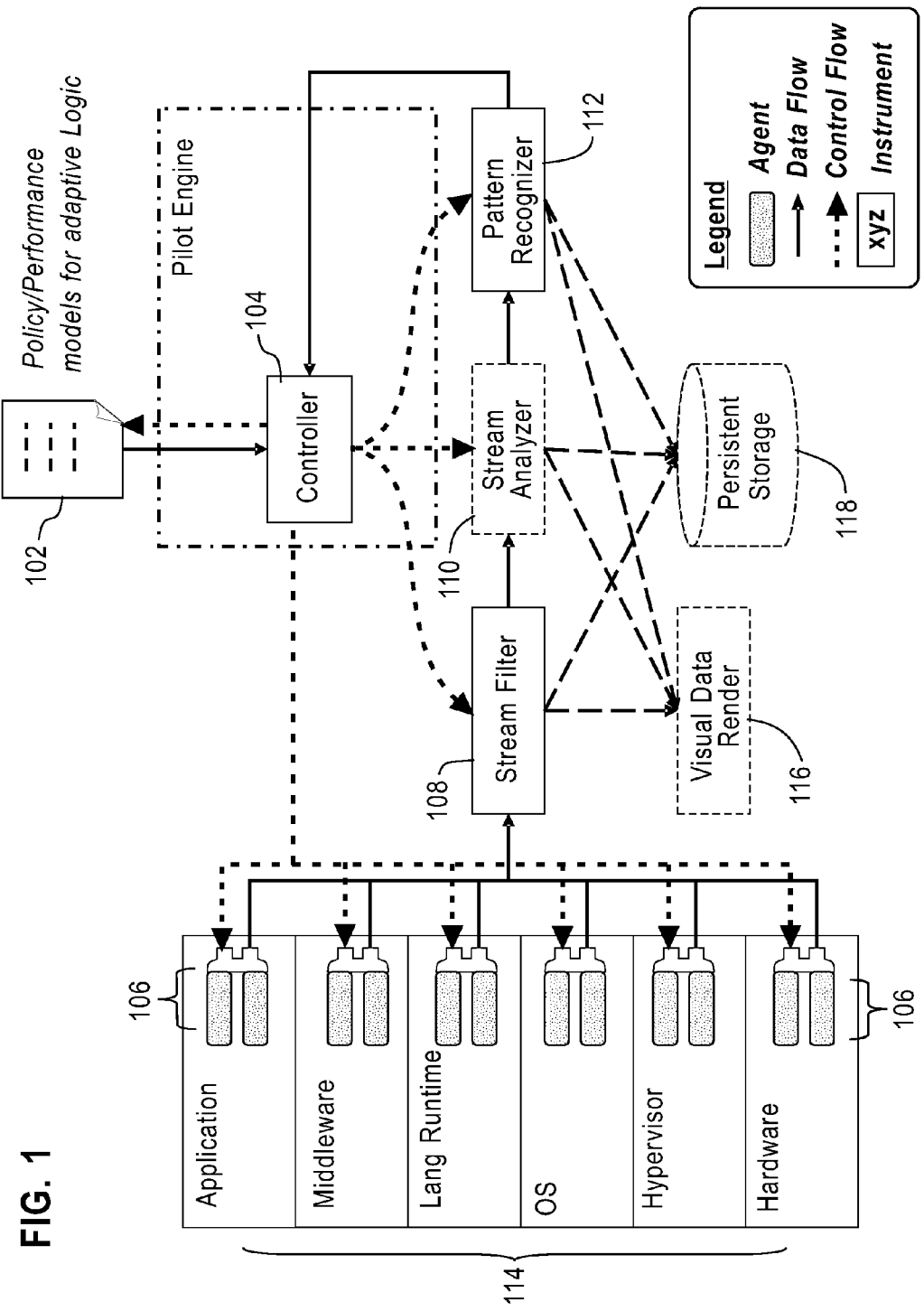
FIG. 1 is an architectural diagram illustrating an adaptive performance profiling system of the present disclosure in one embodiment.

FIG. 1 is an architectural diagram illustrating an adaptive performance profiling system of the present disclosure in one embodiment. A performance model encodes the adaptive refinement logic 102 that captures performance analysis knowledge, for example, thresholds that indicate bottlenecks, and adjusts tuning parameters or policies that shift the metrics used for profiling and/or collecting data. The adaptive logic 102 may be implemented as a logic declarative program, script, or other computer instructions or like, but not limited to those forms. The adaptive logic 102 provides profiling actions to a controller or engine functional component 104. A parser or a transformer, for example, may be included that translates the adaptive logic 102 into profiling actions. An engine or a controller functional component 104 (herein also referred to as a controller) carries out the profiling actions, for example, by issuing commands to one or more agent monitor functional components 106 (herein also referred to as agent monitors), a data or stream filter functional component 108 (herein also referred to as data filter or stream filter), a data or stream analysis functional component 110 (herein also referred to as a stream analyzer), and a pattern recognition functional component 112 (herein also referred to as pattern recognizer).

The commands the controller 104 issues to one or more agent monitors 106 may specify what metric(s) the agent monitors 106 should produce, i.e. whether an agent monitor should capture a particular event (e.g., TLB miss) from the target system. The commands issued to the stream filter 108 may specify what to be consumed, so that it can adapt its filtering logic when metrics from agent monitors 106 have been changed. Examples of such adaptations may include but are not limited to changing the criteria for filtering out noise data based on the different event types. The controller 104 may also instruct a stream analyzer functional component 110 to inspect data or data streams. The controller 104 further may specify the pattern that should be identified by the pattern recognizer functional component 112 from the data streams. In this disclosure, the terms "data" and "data streams" are used interchangeable, and refer to a plurality of data.

As mentioned above, the controller or engine 104 as part of its functionality may include a parser functionality that interprets and translates adaptive logic 102 into action items acceptable to the controller 104. The controller 104 generates and dispatches commands to agent monitor 106, stream filter 108, stream analyzer 110, and pattern recognizer 112.

Agent monitors 106 may be provided for each layer of a system stack, for example, hardware, hypervisor, operating system (OS), language runtime, middleware, application, etc. Agent monitors 106 adjust instrumentations that monitor the target system 114 and may even include, although not required, the instrumentation logic. The agent monitors may also be built on top of standard instrumentation interfaces that are exported by the specific layer of the system stack. Examples of instrumentation or monitoring agents may include but are not limited to, binary code rewriting, aspect oriented techniques for instrumentation for application and middleware layers of the system stack, Java™ agent for monitoring the Java Virtual Machine (JVM™), and native drivers that capture OS activities, hypervisor activities and hardware performance counter numbers. Other interfaces and different mechanisms may be used to communicate with the agents and control the behavior of agents or instrumentation. Agent monitors 106 in the target system 114 adapt their behavior as demanded by the controller 104 and produce new data streams, e.g., monitor and collect data as commanded by the controller 104.

Stream Filter 108 prepares to process different data streams, for example, filters out unwanted, redundant data items, and discards data determined to be noise or outlier. Examples of data streams may include, but are not limited to, thread information for processes, L2 cache access data for cores that share the cache, etc.

Stream analyzer 110 may apply statistical analyses on the data stream. Examples of such analyses may include but are not limited to, ranking the various data streams by their relevance to the overall performance metric, performing principal component analysis (PCA) that selects the stream that has the maximum covariance value with the overall performance data, etc. Optionally, stream analyzer 110 may determine information such as which one among the many streams is the primary contributor to the performance of the target system.

Pattern recognizer 112 may detect patterns of interest that happen in the target system and notify the controller 104, for example, via call back function or interprocess communication (IPC), if not in the same process, or like. Examples of interesting patterns to be detected may include but are not limited to, an abnormal booming of certain events such as bus requests. The pattern recognizer 112 may recognize patterns in the data stream based on predefined patterns, or use previous knowledge or a knowledgebase to determine or recognize the patterns of interest. The pattern recognizer extracts the identified pattern and signals the controller 104. The controller 104, based on the received notification may in turn adjust the profiling actions for driving the agent monitors 106. The notification and the recognized patterns may be also used to adjust or reconfigure the metrics or parameters in the adaptive logic 102.

In one embodiment, the data from the stream filter 108, stream analyzer 110, and pattern recognizer 112 may be delivered to a visualization instrument 116, for example, for analysis and/or presentation to the user. A graphical user interface may provide visualizations such as charts, graphs, tables, dashboards, or alike for aiding the user to view and understand the profiling data. Such data may also be recorded into persistent storage 118. The persistent storage 118 may include storage devices such as disks, tapes, or like media, or any other known or will be known devices that store data.

The performance profiling of the present disclosure in one embodiment provides the capability of adaptively monitoring the activities at different layers of the target system, filtering out noise and irrelevant data, identifying interesting, significant, and/or predefined factors in the obtained data streams, recognizing predefined patterns in data streams, and adjusting the profiling actions accordingly. The performance profiling of the present disclosure in one embodiment enables determining the bottleneck of a target system in a single run. A predefined adaptive logic (also referred to as pilot logic) guides the profiling process, for example, by executing a logic program or scripts, and embodying performance models and the knowledge of reasoning about performance anomalies.

The performance profiling of the present disclosure described above may be embodied as an apparatus that comprises at least an adaptive engine, which can control the profiling process under the guidance of a predefined adaptive logic, and adjust its behavior based on a final goal, such as a target maximum data volume, a target maximum perturbation, or a target accuracy in the collected data and the data previously processed. A bundle of agents planted or installed into the target software system collect performance data, and the adaptive engine administers their behavior. A data filter, a stream analyzer and a pattern recognizer process the collected data and close the inner feedback loop. An outer feedback loop may be present in which the information gathered in the adaptive engine is used to refine the predefined adaptive logic.

The adaptive logic can be written in various languages. A parser may be optionally provided, for example, if the language is not interpreted. For example, the controller engine may be a compiled executable with fixed logics built-in. There may be separate databases for storing the performance models that will be used for composing the adaptive logic program and storing the logic programs as standard routines to be called in new programs. The order of data filtering and stream analyzing can be rearranged, for example, filtering out irrelevant data streams may follow the stream analysis.

Figure 2:
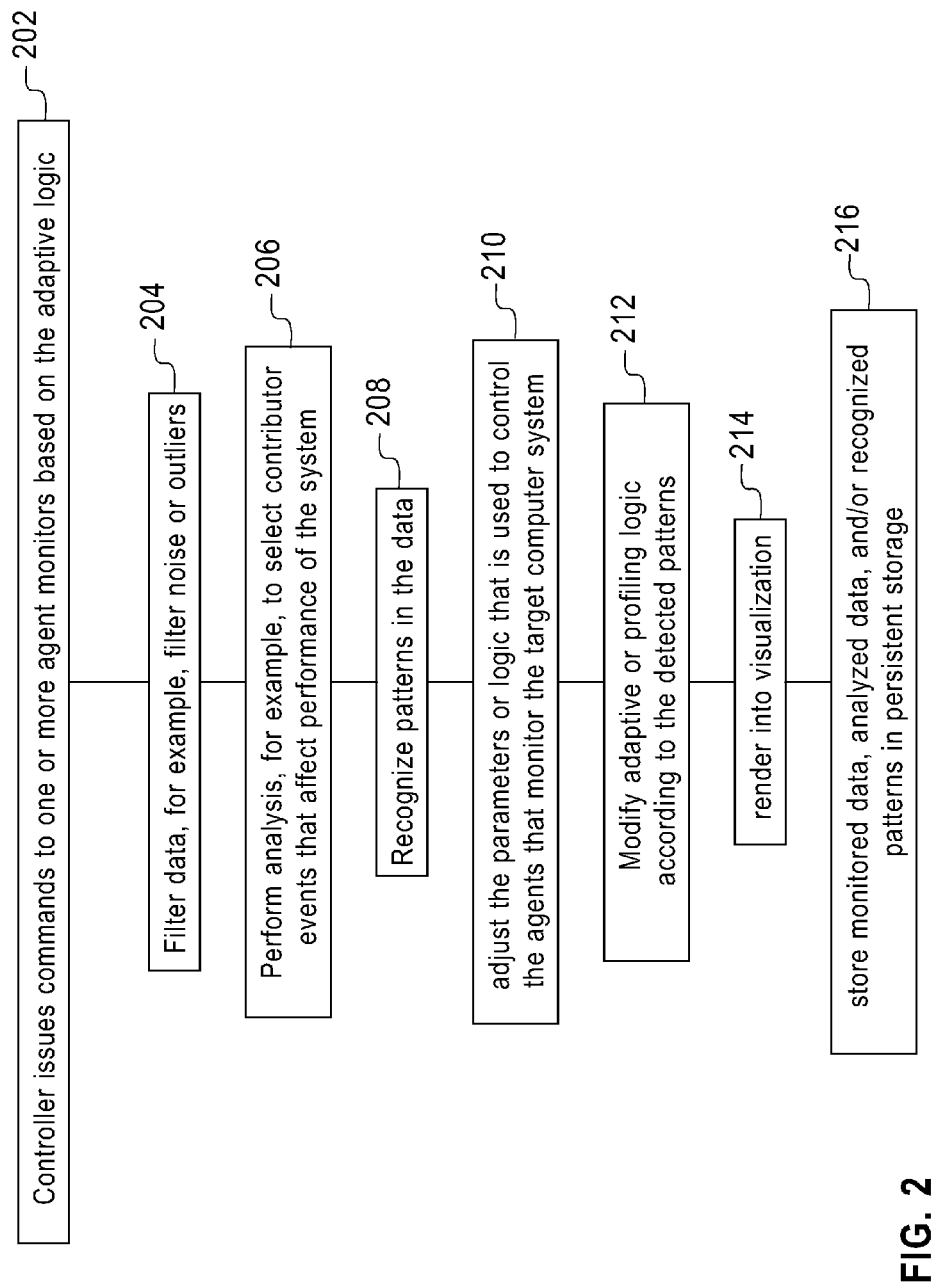
FIG. 2 is a flow diagram illustrating method steps of performance profiling of the present disclosure in one embodiment.

FIG. 2 is a flow diagram illustrating method steps of performance profiling of the present disclosure in one embodiment. At step 202, a controller module based on input from an adaptive logic controls or issues commands to one or more monitor agents that monitor and/or instrument a target computer system whose performance is being profiled. One or more agents may be installed at various layers in the system stack of the target computer system, for example, including but not limited to, hardware, hypervisor, OS, language runtime, middleware, and application layers. Each agent at the associated stack level may observe and collect different sets of events or types of events. For instance, at the hardware level, events such as cache misses may be monitored and data associated with the events may be collected and delivered. At the OS layer, events such as scheduling events may be observed, collected and delivered. At the application layer, events such as completion of transactions, may be observed, collected, and delivered. The adaptive logic used by the controller module in one embodiment is configurable, and may include various metrics or parameters such as thresholds, sampling rates and types of analyses to be performed. The adaptive logic may be embodied as a program directive or a script, or in any other form that can provide instructions to the controller module.

At step 204, the collected data received from one or more agents are filtered, for example, to eliminate noise or outliers. At step 206, the collected filtered data is analyzed, for instance, using mathematical or statistical techniques to rank the various data by their relevance to a user-perceived performance metric. For example, if the profiled system has extremely low throughput (the user-perceived performance metric) during a given interval, any data stream that exhibits a change around that interval is seemingly more interesting than others. For instance, principal component analysis (PCA) may be used to select data that has the maximum covariance value with the user-perceived performance data.

At step 208, one or more patterns are detected in the collected data. In one embodiment, the pattern recognition can be performed on the collected data. The pattern recognition may be done only on filtered data, for instance, if more efficiency is desired. An example of recognized patterns may include, but is not limited to, a short interval of high value, for example, associated with a performance event, that appears periodically. Patterns may be recognized based on predefined patterns. For instance, a pattern recognizer may look for patterns that match or nearly match one or more predefined patterns. In another aspect, a pattern recognizer may use a knowledge base or knowledge acquired from previous recognitions, to detect different patterns occurring in the system that may be determined as being notable for triggering signals or alarms.

At step 210, the detected patterns are used to adjust the parameters or logic that is used to control the agents that monitor the target computer system. For example, according to a periodical drop in CPU utilization by Java™ application threads, the controller engine may decide to take a closer look at the garbage collection behavior in the target system, and thus may instruct the agents to collect events or data related to garbage collection. In other examples, the behavior of the agents may be changed to collect data for only a certain set of performance events, to reduce the collected data volume, to reduce the size of the event output, for example, by discarding uninteresting events while preserving only some representative points, and to adjust the event monitors for future event collection. Further, adjustments may turn selected agents on or off, and change the frequency at which one or more agents collect data or events.

The agents may be adjusted to minimize perturbation. For example, if an interesting event occurs at a high frequency, the event call-back functions in the agent monitor will be executed more frequently, which will induce more instrumentation noise in the resulting trace. One option to minimize the perturbation is to change the event capturing logic so that events are sampled regularly at an acceptable interval, instead of handling every single occurrence of that event type. The agents may be adjusted to minimize the event output. For example, if the call stacks are to be collected, a tunable parameter that helps reduce the event output is the number of recorded stack frames. By limiting the depth of the captured call stack, the volume of generated data can be controlled even before those data are delivered to the filter 108.

At step 212, the adaptive or profiling logic may also be modified according to the detected patterns. For instance, the program directive or script may be automatically reconfigured or reprogrammed, so that when the controller next accesses the adaptive logic for commanding the agents, the adaptive logic would include adjusted parameters and logic.

At step 214, the collected data may be optionally rendered into visualization that aids the users to view or otherwise better understand the performance of the target system. Also optionally, at step 216, the collected data, analyzed data, and recognized patterns may be stored in persistent storage.

In another aspect, automatic reasoning may be provided. Automatic reasoning refers to the process of automatically detecting performance anomalies among various possibilities. There are usually several simultaneously occurring defects that lead to a user-perceivable performance anomaly, but the primary cause is most of the time difficult to find. With adaptive data collection on the target system and the adaptive engine components including controlling engine, adaptive logic, pattern recognition, etc., it is possible to find the real primary cause that leads to the perceived performance anomaly.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of automatically and adaptively profiling for performance analysis of a computer system, comprising:
    controlling one or more agents to monitor a plurality of events occurring in a target computer system based on an adaptive logic;
    filtering collected data associated with said plurality of events;
    analyzing said collected data to determine one or more contributor events that attribute to performance of the target computer system;
    detecting one or more patterns in said collected data;
    a controller engine receiving the detected one or more patterns and automatically determining profiling actions to adjust, the profiling actions to adjust including at least changing types of event data the one or more agents produce, while at the same time minimizing perturbation which induces more instrumentation noise to the target computer system resulting from the adjusting;
    adjusting automatically by the controller engine the controlling of said one or more agents based on said detected one or more patterns; and
    modifying said adaptive logic based on said detected one or more patterns, the adaptive logic providing at least said changes in types of event data to generate,
    wherein the filtering, the analyzing and the detecting steps form an inner feedback loop of the method of automatically and adaptively profiling for performance analysis of a computer system, and the adjusting and the modifying steps form an outer feedback loop of the method of automatically and adaptively profiling for performance analysis of a computer system.

2. The method of claim 1, wherein the modifying comprises:
    reconfiguring said adaptive logic based on said detected one or more patterns, by automatically reprogramming a program of said adaptive logic.

3. The method of claim 2, wherein said one or more agents are associated with one or more system stack layers of said target computer system respectively, and said one or more agents respectively monitor a plurality of events occurring in said one or more system stack layers.

4. The method of claim 2, wherein said step of filtering includes filtering noise data from said collected data.

5. The method of claim 2, wherein said step of analyzing includes:
    performing principal component analysis and selecting data that has a maximum covariance value; or
    ranking said collected data by relevance to performance metrics; or
    combinations thereof.

6. The method of claim 2, wherein said step of detecting includes:
    detecting one or more patterns that match predefined patterns; or
    detecting one or more patterns based on previous knowledge of event patterns; or
    combinations thereof.

7. The method of claim 2, wherein said step of adjusting includes:
    adjusting one or more parameters that define behavior of said one or more agents.

8. The method of claim 7, wherein said step of adjusting one or more parameters that define behavior of said one or more agents includes adjusting said one or more parameters to:
    reduce data volume being collected;
    change collection frequency of said one or more agents;
    switch said one or more agents on or off;
    minimize perturbation; or
    minimize one or more event outputs; or
    combinations thereof.

9. The method of claim 1, wherein said one or more agents are associated with one or more system stack layers of said target computer system respectively, and said one or more agents respectively monitor a plurality of events occurring in said one or more system stack layers.

10. The method of claim 1, wherein said step of filtering includes filtering noise data from said collected data.

11. The method of claim 1, wherein said step of analyzing includes:
    performing principal component analysis and selecting data that has a maximum covariance value; or
    ranking said collected data by relevance to performance metrics; or
    combinations thereof.

12. The method of claim 1, wherein said step of detecting includes:
    detecting one or more patterns that match predefined patterns; or
    detecting one or more patterns based on previous knowledge of event patterns; or
    combinations thereof.

13. The method of claim 1, wherein said step of adjusting includes:
adjusting one or more parameters that define behavior of said one or more agents.

14. The method of claim 13, wherein said step of adjusting one or more parameters that define behavior of said one or more agents includes adjusting said one or more parameters to:
reduce data volume being collected;
change collection frequency of said one or more agents;
switch said one or more agents on or off;
minimize perturbation; or
minimize one or more event outputs; or
combinations thereof.

15. The method of claim 1, wherein said adaptive logic is configurable.

16. A system for adaptively profiling for performance analysis, comprising:
a controller engine module operable to receive logic for commanding one or more agents to control behavior of said one or more agents in monitoring a target computer system;
a data filter module operable to receive collected data from said one or more agents and filter at least noise from said collected data;
an analyzer module operable to analyze said collected data and determine a plurality of contributing events that affect performance of the target computer system; and
a pattern recognizer module operable to detect one or more patterns in said collected data,
said controller engine module further operable to receive said detected one or more patterns, automatically determine profiling actions to adjust and automatically adjust the controlling of said one or more agents based on said detected one or more patterns, the profiling actions to adjust including at least changing types of event data the one or more agents produce, while at the same time minimizing perturbation which induces more instrumentation noise to the target computer system resulting from the adjusting, the controller engine further operable to modify said logic based on said detected one or more patterns, the logic providing at least said changes in types of event data to generate,
wherein the data filter module, the analyzer module and the pattern recognizer module perform processing that form an inner feedback loop of the system of adaptively profiling for performance analysis, and the controller engine performs processing that forms an outer feedback loop of the system of adaptively profiling for performance analysis.

17. The system of claim 16, further including an adaptive logic module operable to provide said logic for commanding said one or more agents, said logic further for controlling profiling of performance analysis, the adaptive logic module being automatically reprogrammed based on the automatically determined profiling actions to adjust.

18. The system of claim 16, wherein said controller engine module adjusts the controlling of said one or more agents to reduce data volume output from said one or more agents.

19. The system of claim 16, wherein said controller engine module adjusts the controlling of said one or more agents to tune one or more parameters that control behavior of said one or more agents.

20. The system of claim 16, further including:
a visual data renderer module operable to transform said collected data into visualization for presentation to a user.

21. The system of claim 16, further including:
a persistent storage module operable to store said collected data and said one or more recognized patterns.

22. A system for adaptively profiling for performance analysis, comprising:
one or more agents operable to monitor a target computer system;
a data filter module operable to receive collected data from said one or more agents and filter at least noise from said collected data;
an analyzer module operable to analyze said collected data and determine a plurality of contributing events that affect performance of the target computer system;
a pattern recognizer module operable to detect one or more patterns in said collected data;
a controller engine module operable to receive logic for controlling behavior of said one or more agents, said controller engine module further operable to receive said detected one or more patterns, automatically determine profiling actions to adjust and automatically adjust the controlling of said one or more agents based on said detected one or more patterns, the profiling actions to adjust including at least changing types of event data the one or more agents produce, while at the same time minimizing perturbation which induces more instrumentation noise to the target computer system resulting from the adjusting, the controller engine module further operable to signal the adjusted profiling actions to the pattern recognizer module, the analyzer module and the data filter module; and
an adaptive logic module operable to provide said logic for commanding said one or more agents, said logic further for controlling profiling of performance analysis, said adaptive logic module further operable to be reconfigured based on said detected one or more patterns,
the controller engine further operable to modify said logic based on said detected one or more patterns, the logic providing at least said changes in types of event data to generate,
wherein the data filter module, the analyzer module and the pattern recognizer module perform processing that form an inner feedback loop of the system of adaptively profiling for performance analysis, and the controller engine performs processing that forms an outer feedback loop of the system of adaptively profiling for performance analysis.

23. The system of claim 22, wherein said adaptive logic module includes a program directive, script, or combination thereof.

24. A program storage device readable by a machine, tangibly embodying a program of instructions executable by the machine to perform a method of automatically and adaptively profiling for performance analysis of a computer system, comprising:
controlling one or more agents to monitor a plurality of events occurring in a target computer system based on an adaptive logic;
filtering collected data associated with said plurality of events;
analyzing said collected data to determine one or more contributing events that affect performance of the target computer system;
detecting one or more patterns in said collected data;
a controller engine receiving the detected one or more patterns and automatically determining profiling actions to adjust, the profiling actions to adjust including at least changing types of event data the one or more agents produce, while at the same time minimizing perturbation which induces more instrumentation noise to the target computer system resulting from the adjusting;

adjusting automatically by the controller engine the controlling of said one or more agents based on said detected one or more patterns; and modifying said adaptive logic based on said detected one or more patterns, the adaptive logic providing at least said changes in types of event data to generate, wherein the filtering, the analyzing and the detecting steps form an inner feedback loop of the method of automatically and adaptively profiling for performance analysis of a computer system, and the adjusting and the modifying steps form an outer feedback loop of the method of automatically and adaptively profiling for performance analysis of a computer system.

25. The program storage device of claim 24, further including:

reconfiguring said adaptive logic based on said detected one or more patterns.